UNITED STATES PATENT OFFICE.

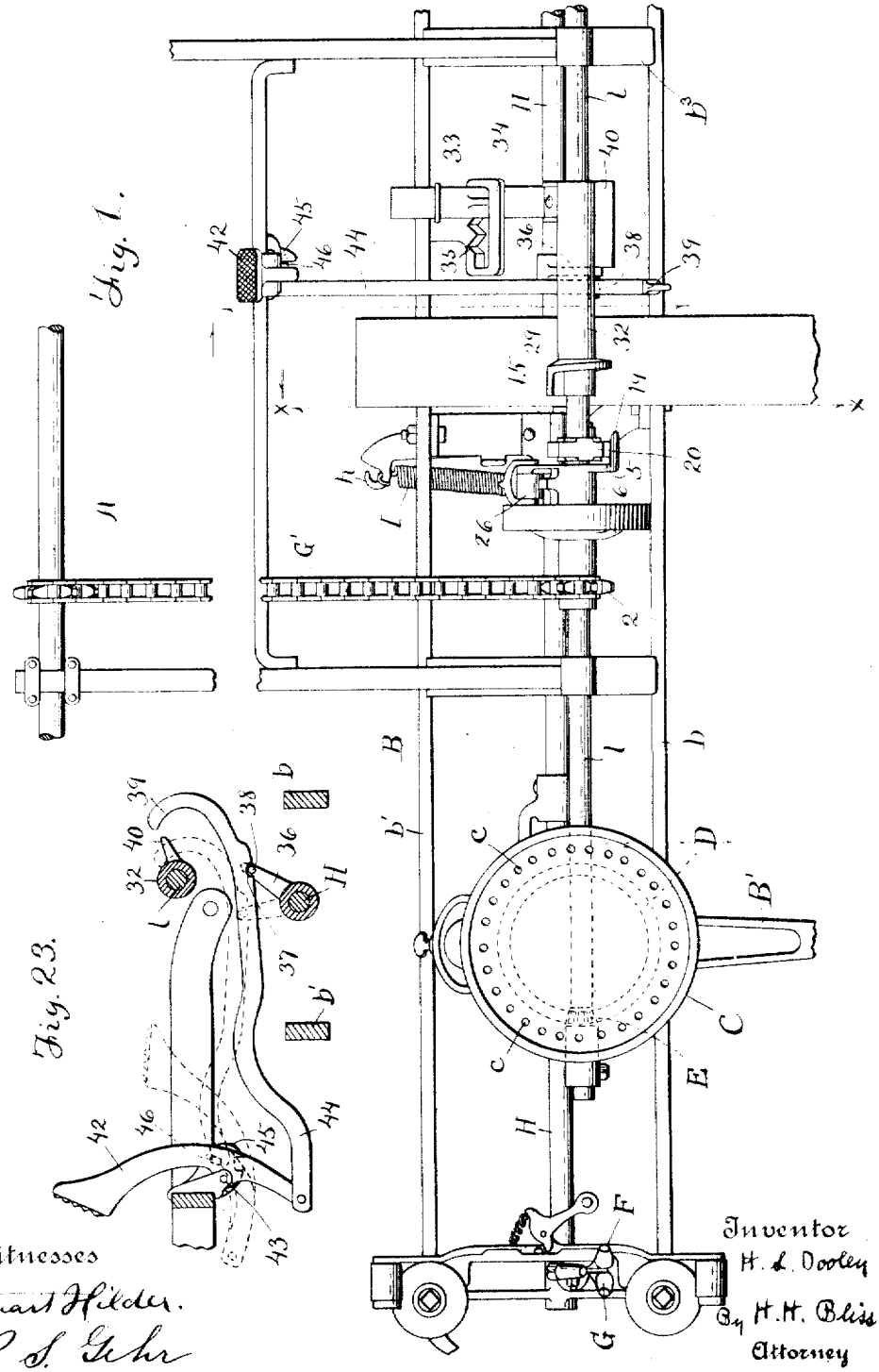

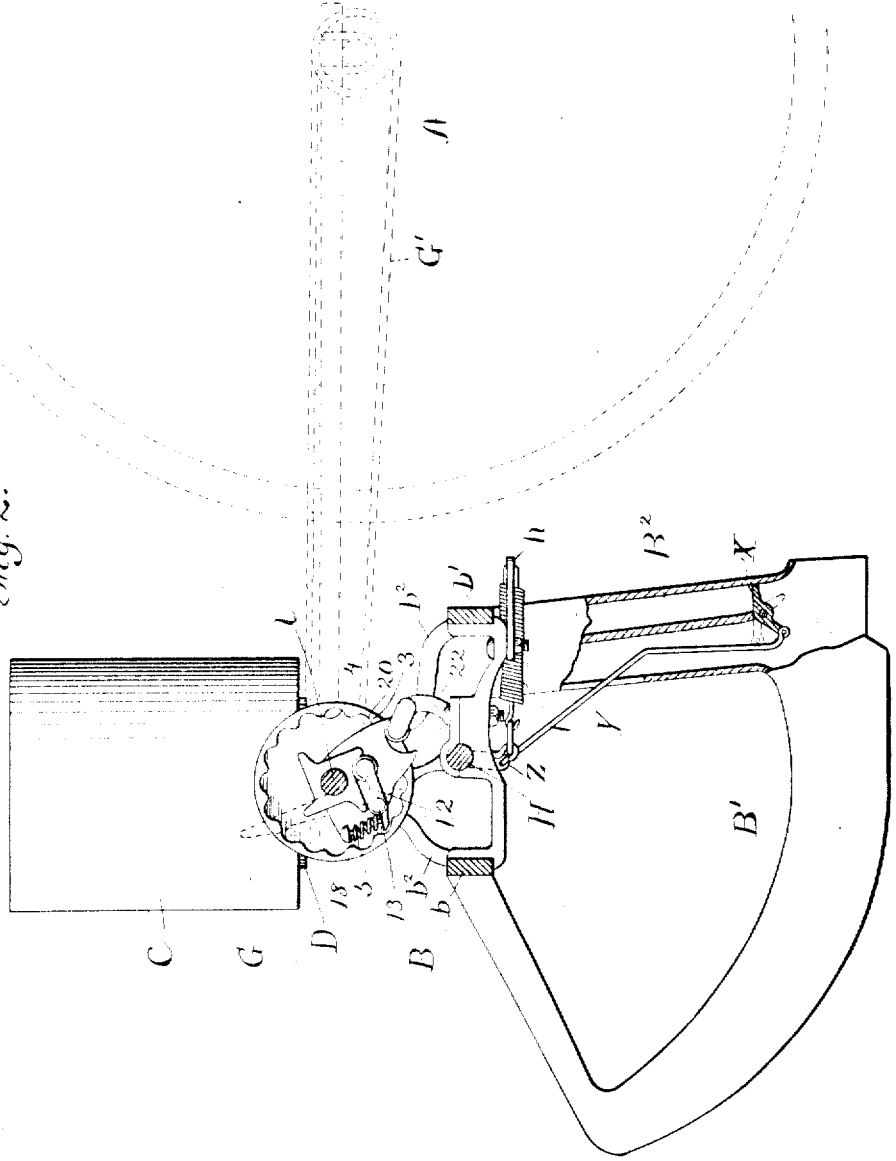

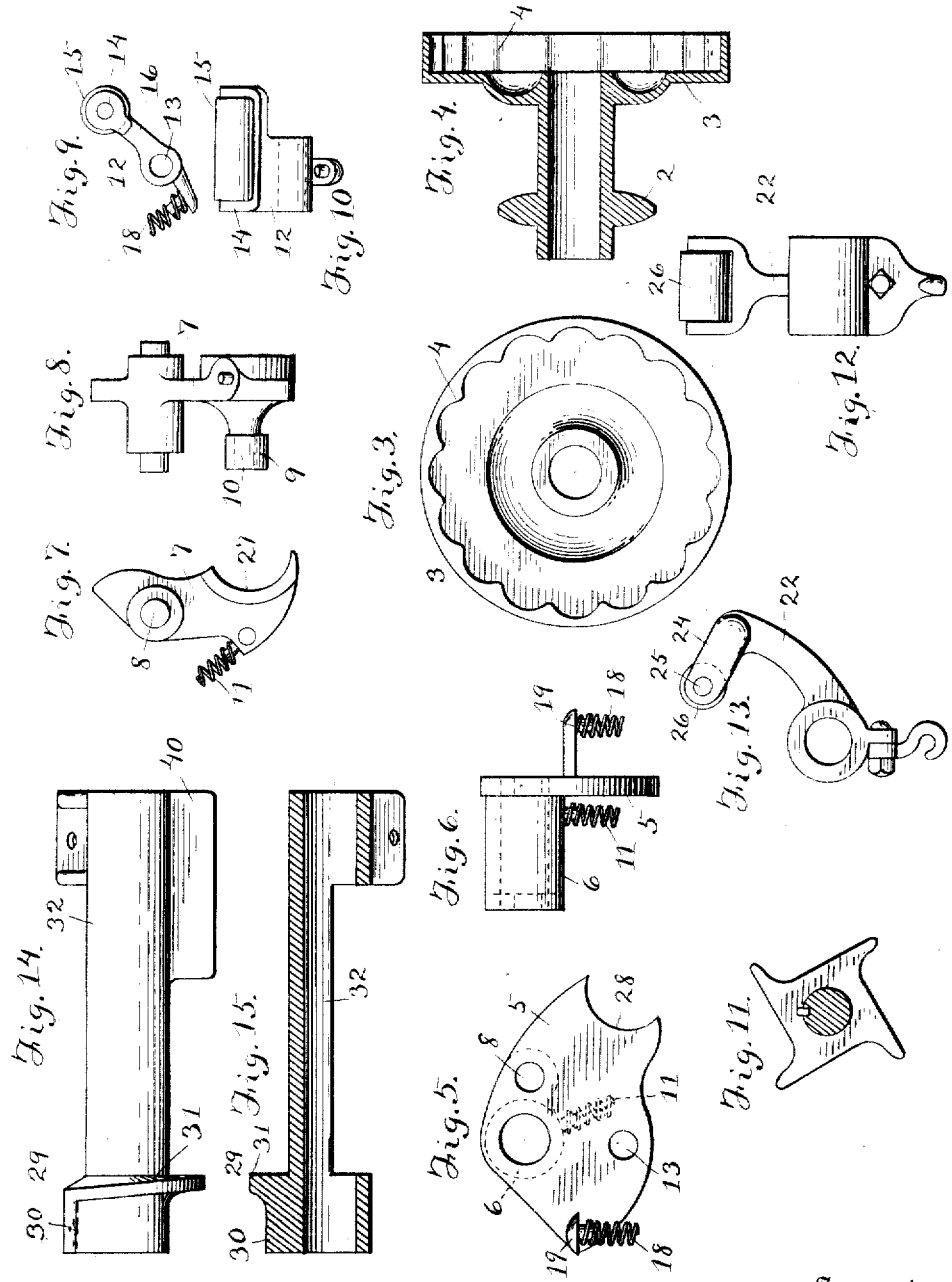

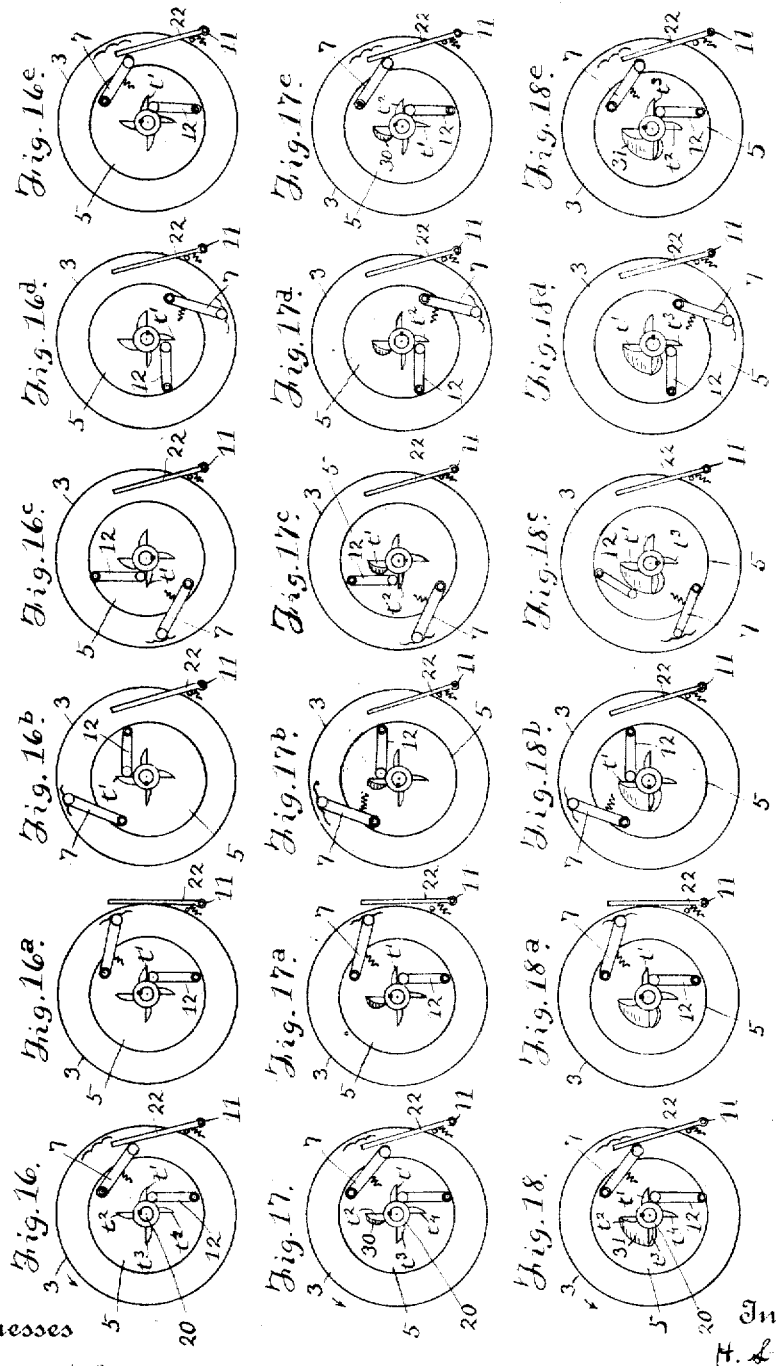

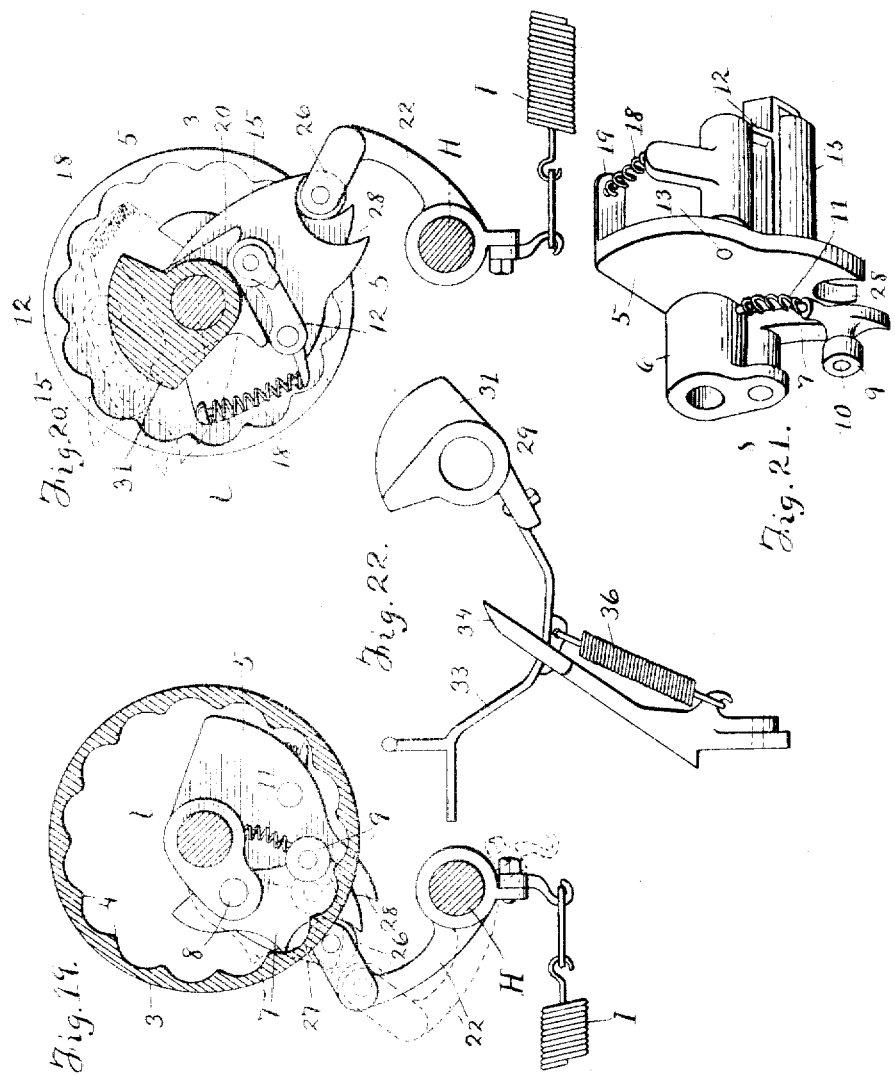

HARRY L. DOOLEY, OF ROCK ISLAND, ILLINOIS.

VARIABLE-DROP PLANTER.

1,138,941.      Specification of Letters Patent.      Patented May 11, 1915.

Application filed May 14, 1910. Serial No. 561,349.

*To all whom it may concern:*

Be it known that I, HARRY L. DOOLEY, citizen of the United States, residing at Rock Island, in the county of Rock Island and State of Illinois, have invented certain new and useful Improvements in Variable-Drop Planters, of which the following is a specification, reference being had therein to the accompanying drawing.

This invention relates to improvements in seed planting mechanism, particularly corn planters or planters of the class which are adapted to deposit at each seed dropping point a number of seeds, which number can be varied at will. As is now well known, it is frequently desirable to so set the parts of such a planter that it can deposit at each of a series of equi-distant dropping points a number of seeds greater than one (these dropping points being termed "hills" and each hill receiving two, three, or four seeds), and at other times so set them that they will deposit only a single kernel at each dropping action, this operation being generally termed "drilling". And several sorts of these "variable drop" planters have been proposed, comprising structural elements by which the operator can cause the dropping of either two or three or four kernels in a hill, and also can so adjust the parts that, if accurately manipulated at proper times, they can be used for drilling. But serious trouble has been experienced, and great inaccuracy in drill planting results from their use because of the fact that the necessary accurate manipulation of the adjustable parts is not practised by the farmer. And as the earlier machines referred to have permitted him to set the parts for drilling at improper times, the irregular planting referred to has been caused. For example, if the parts happen to be set for hill-dropping two kernels to the hill, and the operator should at such a time make the adjustments required for drilling, the line of the "row" will comprise a series of varying distances between dropping points, some longer and some shorter. With such planters, the adjusting of the mechanism for "drilling" comprises the opening of the valves and holding them open, the rocking of the check forks to an inactive position and there locking them, and the connecting of the seeding mechanism to its axle driver and permitting it to remain connected during the drilling operation. And it will be seen that if all of these can be accomplished while the parts are arranged for planting two kernels or three kernels in a hill, very inaccurate drilling will result. I overcome this difficulty, and secure accuracy in drilling, by providing the parts which constitute the "variable drop" with devices which positively prevent the operator from connecting the seeder to the axle driver until after he has positioned the adjustable parts of the driver to the positions where they will cause the dropping of the kernels one by one at uniform distances along the row, and until after he has thrown out of action the devices which cause the dropping of two or more kernels at the end of the predetermined intervals.

In order that a controlling and stopping mechanism embodying my improvements may be readily understood, I have, in the drawings, illustrated a variable drop mechanism in detail, so that the action of the control and stop, under any circumstances, can be fully appreciated.

In the drawings—Figure 1 is a plan view of a part of a corn planting machine embodying the said improvements. Fig. 2 is a vertical section taken on the line $x$—$x$ of Fig. 1. Fig. 3 is a face view of the loose clutch wheel. Fig. 4 is a section of the clutch wheel and its driving sprocket. Fig. 5 is a face view and Fig. 6 is a side view of the clutch plate. Fig. 7 is a side view and Fig. 8 an edge view or elevation of the pivoted clutch arm. Fig. 9 is a side view and Fig. 10 a side elevation of the lever arm interposed between clutch plate and the shaft. Fig. 11 is a face view of the toothed wheel secured to the seeder shaft. Fig. 12 is a plan view and Fig. 13 is an edge view of the trip lever. Figs. 14 and 15 are elevations at right angles to each other of the devices for disengaging the clutch from the seeder shaft. Figs. 16 to 16ᵉ inclusive are a series of diagrams illustrating the positions and action of the parts of the clutch, and the parts interposed between the clutch and the seeder shaft, at the time when the planter is dropping four kernels to a hill or at the end of each planting interval. Figs. 17 to 17ᵉ are a series of diagrams similar in character and purpose, illustrating the position and actions of the parts during a cycle when they are set for delivering three seeds or kernels to a hill, or at the end of each interval. Figs. 18 to 18ᵉ inclusive are a series of similar diagrams illustrating the parts and their actions during each cycle when they are adjusted for delivering two seeds or kernels to a hill, or at the end of each interval. Fig. 19 is a sectional view taken on the line 19—19 in Fig. 1. Fig. 20 is a sectional view taken on the line 20—20 of Fig. 1. Fig. 21 is a perspective detail view of part of the clutch mechanism. Fig. 22 is a side elevation of the cam disengaging device, its operating arm and locking bracket. Fig. 23 is a vertical sectional view taken on the line 23—23 of Fig. 1.

The parts of the planting mechanism which have been selected for the purposes of illustration comprise a rear frame A, mounted as usual upon two ground wheels, and a front frame B, these two frames being hinged together on a horizontal axis and having any preferred form of adjusting mechanism for bringing them to the desired relations to each other and securing them in the desired relative position.

The front frame B has at the ends ground opening or furrow opening runners B¹, which may be of the usual character, and seed conducting chutes or boots at B² provided with valves for receiving, temporarily holding and delivering the seeds or kernels which may be deposited upon them.

The frame B has by preference a front transverse bar $b$, and a rear bar $b^1$. These are connected together by cross bars or braces as shown at $b^2$, $b^3$. At each end of this frame, that is to say, on each side of the mechanism as an entirety, is placed a seed receptacle C. Into this a quantity of the seed can be placed and at the bottom it can be provided with any known or suitable delivering device. I have indicated that there is present in the machine in the drawings a rotary plate at the bottom of each of said receptacles capable of receiving the seeds from the mass and also capable of being rotated so as to deliver them to the aforesaid chutes or boots and to the valve device therein. Seed plates are now known of numerous sorts, any one of which can be used in this place and for this purpose. I have indicated a circular plate with a circular series of apertures or cells; but instead thereof use can be made of any of the forms of "edge-drop" plates such, for example, as are shown in my Patent No. 682,178, dated Sept. 10, 1901.

The seed plates are rotated by horizontal gearing at D and driving pinions E. Here also there can be numerous modifications, as numerous forms of construction and various arrangements of these parts are now well known.

The mechanism illustrated is also provided with what is known as a "check-row" apparatus, there being a check head at F on each side of the machine, each outside of a seed box or receptacle. These check heads and their several parts may be of any preferred form. As shown, each has a check fork at G with which engages the tappets on the check row wire. The check forks are connected to a rock shaft H which extends across the machine on lines below the seed receptacle, by preference. A spring at I is connected to a crank arm $h$, this spring tending to hold the rock shaft H in a predetermined position and so as to have the check forks held vertically.

The seeder shaft is indicated by 1 this extending across the machine on a line below the seeder boxes and having secured to it the pinions E, E.

It is repeated that the parts above described are here illustrated and referred to as constituting one of the mechanisms to which parts can be applied that more particularly embody the essential features of the invention.

The shaft 1 is rotated from the ground wheels or covering wheels, or from the axle upon which they are mounted. As shown, power is transmitted to the front frame by a sprocket chain G' engaging with a sprocket wheel 2, mounted loosely on the shaft 1. The sprocket wheel is cast with, or rigidly secured to a clutch element which, as shown, consists of a wheel or short drum 3 having internal teeth 4. Normally, the sprocket wheel 2 and the toothed drum 3 are continuously rotating under the action of the chain G as the machine advances.

At times, it is desired to obtain from one rotation of this sprocket 2 and wheel 3 a predetermined part of one rotation of the shaft; at other times, to obtain from one rotation of the sprocket wheel another predetermined part of a revolution of the shaft 1; and at still other times, during one revolution of the sprocket still another predetermined part of a rotation of the shaft. This is accomplished by the following device: 5 is a plate having a tube 6 which is loosely mounted on the shaft 1. The plate part 5 projects radially from the shaft in a plane a short distance from the clutch wheel 3. To this part is pivoted a clutch arm 7, the axis at 8 of the pivot which connects them being eccentric to the axis of the shaft 1. This clutch arm 7 carries a roller 9 mounted on a stud 10 which extends laterally from the arm, the roller normally lying in the transverse planes of the teeth 4 on the clutch wheel 3.

The arm 7 can be swung toward or away from the axis of the shaft and toward and from the teeth 4. A spring 11 bears against the outer end of the arm and tends to swing it into such position that it can be engaged by the teeth 4 of the clutch wheel 3.

It will be seen that the arm 7 can be pressed so that roller 9 will be swung inward away from the circles of rotation of the teeth 4, and if the arm be held in that position the sprocket wheel 2, and clutch wheel 3 will continue rotating without affecting either the plate 5 or the arm 7, they remaining stationary, and the shaft 1 also. But if the arm 7 is allowed to be pressed outward by the spring 11 it will be engaged by the teeth 4, and the arm and the plate 5 will be rotated with the sprocket and the clutch wheel, said arm and plate turning freely on the shaft unless connected in some way with the latter. The plate 5 can be connected to the shaft as follows: On the side of the plate opposite to the side where the arm 7 is placed there is mounted a lever 12. It is connected to the plate by a pivot at 13 which is eccentric to the axis of the shaft 1. At 14 there is a crank pin extending laterally from the lever 12 and this is preferably provided with an anti-friction roller 15. The pin 14 and the roller 15 are on the longer arm 16 of this lever 12. 18 is a spring engaging with the short arm 17 and also engaging with an abutment at 19 on the plate 5. Immediately adjacent to this loosely mounted plate 5 there is a toothed wheel 20 rigidly secured to the shaft 1 and having, in the particular construction shown, four teeth $t^1$, $t^2$, $t^3$, $t^4$. The lever arm 12 is so positioned that, normally, the spring 18 tends to move the crank pin 14 and the roller 15 inward so as to lie inside of the outer circles of rotation of the teeth $t^1$, $t^2$, $t^3$, $t^4$. But the lever arm can be moved, so that the pin 14 and the roller 15 shall swing outside of the said circles of rotation. When they are outside of the teeth $t^1$, $t^2$, $t^3$, $t^4$, the sprocket wheel 2 and the clutch wheel 3 will rotate loosely on the shaft, the latter remaining stationary. But if the crank pin 14 and the roller 15 are in their innermost position, they will engage with one or another of the teeth $t^1$, $t^2$, $t^3$, $t^4$, and at such time, if the clutch arm 7 is engaged by the clutch wheel 3, rotation will be imparted to the whole train of parts, namely, the train commencing with the sprocket wheel 2 and terminating with the wheel 20, the shaft 1 and the seed plate C.

The clutch arm 7 is, normally, held in its position of disengagement from the clutch wheel 3 by means of the lever or crank arm 22. This is secured to the rock shaft H. The rock shaft is actuated in the usual manner by the check row head at each side with a fork connected to this shaft H.

The crank arm or lever 22 is bent forward somewhat at its outer end, as shown at 24, and has a laterally extending pin 25 with a roller 26. This roller lies in the planes of rotation of the clutch arm 7 and of the plate 5, the arm having at 27 a cavity or seat to receive the roller 26, and the plate 5 having a similar seat at 28.

To cause the crank pin and its roller 15 on the lever arm 12 to move to a position outside of the circles of rotation of the teeth $t^1$, $t^2$, $t^3$, $t^4$, use is made of an adjustable cam structure 29. It has two parts, one being a cam at 30 of a relatively short length and the other a cam at 31 of relatively longer arc. These are carried by and preferably cast with a supporting and adjusting sleeve 32, which fits loosely upon the shaft 1 and can slide along it. When the cam element is in one position, longitudinally of the shaft, the cam part 30 lies in the planes of rotation of the end part of the roller 15 and the latter is thrown outward during one-fourth of a revolution of the plate 5. If the cam element is moved to such position along the shaft that the cam section 31 is in the plane of revolution of the end part of the roller 15, the latter will be thrown outward and held away from the teeth of wheel 20 during two-quarters of a revolution of the plate 5.

In order that the ends which I aim at may be understood, reference can be made to the series of diagrammatic views in Figs. 16 to 18$^e$. When the parts are operating in such way to deposit four seeds or kernels in each hill, the diagrammatic views from 16 to 16$^e$ will illustrate the successive steps in rotation of the clutch and its adjacent parts. Referring to said diagrams it will be seen that the clutch arm at 7 is held out of engagement with the clutch wheel 3 by the arm 22 on the rock shaft H and at such times the clutch wheel 3 is freely revolving while the other parts interposed betwen it and the shaft 1 remain stationary, as shown in Fig. 16. But if the holder 22 be withdrawn for an instant from the clutch arm 7 the latter is forced by its spring into engagement with the clutch wheel 3 and there upon rotation is imparted to the plate 5 and by the latter to the lever 12. This being in engagement with the tooth wheel 20, the shaft 1 will be turned through one revolution, the tooth $t^1$ being advanced to the positions, successively, of the teeth $t^2$, $t^3$, $t^4$, as shown in Figs. 16$^a$ to 16$^e$, and finally brought back to its initial position as shown at 16$^e$. At the instant this latter position is reached the part 22 pressing against the clutch arm 7 forces it away from the clutch wheel 3 and the plate 5 and all the parts connected with it remain stationary while the clutch wheel 3 continues to rotate. In other words, when the parts are in the relative positions just described, and illustrated in this series of diagrams, a complete rotation is imparted to the shaft 1, which complete rotation may be considered as composed of four equal parts. At the termination of each one of these parts of rotation of this shaft, one of the seed or kernel apertures $c$ in each seed plate C is carried around to its depositing point and drop its seed or kernel; and four of the latter will be dropped.

If it is desired to drop three kernels in a hill, the clutch and the parts adjacent thereto go through a cycle diagrammatically illustrated in the series of Figs. 17 to 17ᵉ. The holder at 22 being dropped back, as shown in Fig. 17ᵃ, the clutch arm 7 drops into engagement with the wheel 3, and the plate 5, through the lever 12, moves a quarter during the revolution of the shaft 1, bringing the tooth $t^1$ to the position of the tooth $t^2$, as shown in Fig. 17ᵇ. If, just prior to this, the cam 30 has been moved to the path of the roller 15, the latter rides up the cam to points outside of the teeth $t^1$, $t^2$, etc., and after being carried a short distance by the plate 5, drops down into engagement with the tooth $t^2$ on the wheel 20, and remains in engagement with that tooth while the plate 5 travels past the position shown in Fig. 17ᵃ and reaches the position shown in Fig. 17ᵉ, at which latter position the holder 22 moves the clutch arm 7 out of engagement with the clutch wheel 3 and the plate 5 and the shaft 1 thereafter remaining stationary. It will be seen that during this cycle illustrated in these diagrams from Fig. 17 to Fig. 17ᵉ, the lever 12 is out of action during one-quarter of a revolution of the clutch 3 and plate 5, that is to say, the shaft 1 has imparted to it only three-quarters of a revolution; and as each fourth of a revolution corresponds to the distance of travel of one of the seed calls it will be seen that during such cycle three cells will be advanced and three kernels dropped in a hill.

If at any time it is desired to drop two kernels in a hill the parts described are caused to move from one to the other of the positions, which are diagrammatically illustrated in Figs. 18 to 18ᵉ. In this case, after the holder 22 releases the clutch arm 7, and the plate 5 and shaft 1 begin rotation, as shown in Figs. 18ᵃ and 18ᵇ, the lever arm 12 is thrown out of engagement with the tooth $t^1$ by the cam 31, and the latter is of such length as to be inactive during two-quarters of the revolution of the plate 5 and travels idly around one-half of the circle until it escapes from the cam 31, when it drops down into engagement with tooth $t^3$, and remains in engagement therewith during the remaining quarter of the revolution of the clutch. When the tooth $t^3$ reaches the position initially occupied by the tooth $t^1$ at the commencement of the cycle, the holder 22 presses the clutch arm 7 away from the clutch wheel 3 and the plate 5 and the parts driven thereby come to rest and remain stationary while the sprocket and clutch wheel 3 continue rotating.

It will be seen that while the parts are related and moving in the way described, first, the shaft 1 will have imparted to it one-quarter of a revolution of the mechanism, then, the shaft will remain stationary for two-quarters of a revolution, and, finally, will again move through one-fourth of a revolution, this resulting in bringing two of the seed cells or kernel apertures of the seed plates to the dropping point in each seeding mechanism.

The operator can cause the clutch devices to so actuate the shaft as to obtain any of its dropping actions by the sliding of the cam element 29 toward or from the plate 5. This sliding he accomplishes by means of the foot lever or arm 33 which passes through a guide-way 34, the latter having in one of its edges stop notches 35. A spring 36 normally tends to press the arm 33 into one of the notches 35 and to hold the sleeve in one position or another until it is released by the foot and moved to another notch.

The operation of a planter containing my improved variable drop devices will be readily understood from the drawings and the above description.

Assuming that the preliminary conditions have been met, that is, that the check-row wire has been properly placed across the field and on the check head supports, and that the parts of the clutching apparatus are set for planting three kernels to the hill, the following actions will occur as the machine moves across the field parallel to the wire. As it advances the ground wheels and axle through the chain 35 cause a continuous rotation of the sprocket wheel 2 and the clutch wheel 3. When the machine approaches one of the tappets on the wire it engages with the check fork G and imparts a comparatively quick rocking action to the shaft H which, in turn, effects the opening of the valve or valves, and at about the same instant effects also the backward movement of the trip-lever 22. The latter action brings the crank pin 25 and the roller 26 out of engagement with the clutch arm 7. Thereupon the arm instantly is engaged by one of the teeth 4 of the clutch wheel 3. Rotation at once commences of the plate 5, and the lever arm 12, which being in engagement with one of the teeth $t^1$, etc., on the wheel 20, imparts movements to the seeder shaft 1, such as are indicated by the diagrammatic views 17 to 17ᵉ, these movements resulting in two movements of the seeder shaft, one movement being equal to one-quarter of a revolution and the second being equal to two-quarters of a revolution, the cam at 30 taking the roller 10 out of action during one-quarter of a revolution and allowing the shaft to remain stationary.

Each of the seed plates at C has, during the steps just referred to, imparted to it a movement equal to the distance from one seed cell to the next and then after a pause a movement equal to the distance between one seed cell and the second behind it, or in other words, the total movement of the seed plate is equivalent to three of the distances from one seed cell to the next. Consequently there will be three kernels dropped during the single revolution of the shaft 1.

During the time just referred to, the short section 30 of the cam element 29 lies in the path of the roller 10.

When it is desired to deliver any other number of kernels, say two at each dropping action, the driver, by his foot releases the cam sleeve 32 from the central notch and slides it toward the clutch mechanism, that is until the foot lever reaches the next notch; this throwing the longer cam section 31 into the plane of rotation of the roller 9. The actions during any cycle are then such as are above described and illustrated in the series of diagrams from Figs. 18 to 18ᵉ.

If it is desired to drop four kernels to a hill, the cam element 29 is, by the driver's foot, withdrawn entirely from the plane of rotation of the roller 9; and consequently the roller remains at a fixed radial distance from the axis and in engagement with one of the teeth $t^1$, etc., of the wheel 20, during the entire cycle. During this time the several parts are moved in the manner and to and from the several positions shown in the series of diagrams in Figs. 18 to 18ᵉ.

From the description above given and an inspection of the apparatus illustrated, it will be seen that I combine with the seed plate, which may be regarded as the means for counting or measuring seeds or kernels, a primary power transmitter or driver, here typified by the sprocket wheel and clutch wheel 3, and a secondary driver typified for example by the plate 5 and its attachments, together with means for connecting the secondary driving element with the primary driver during a predetermined cycle of movement (in this instance one complete rotation of the secondary driving element), and also means which are controllable at will for holding the secondary driver in continuous connection with the counting or measuring mechanism during the entire period of said cycle, or for holding it in connection with the counting or measuring mechanism during each of several minor periods included within the said cycle, during said periods, there being a series of movements of varying magnitude imparted to the counting or measuring mechanism.

I am aware of the fact that mechanism of this general class has been heretofore made or proposed wherein use was made of a primary power transmitter or driver running continuously and loosely, together with means interposed between it and the counting or measuring mechanism which should have a predetermined cycle; but in said earlier mechanisms there was but one impulse or movement imparted to the measuring or counting mechanism during the said cycle; whereas in my case the cycle (as for example the one complete rotation of the plate 5) is fixed and determined by the conditions of the parts of the mechanism as an entirety, and this cycle remains the same irrespective of any varying adjustments that are effected by the means that are operated at will. In other words, I so construct and relate the parts that during this fixed and invariable cycle of a driving element I can impart power therefrom to the counting or measuring mechanism with a series of movements of the latter of varying magnitude, but all occuring during the said cycle.

When it is desired to use the seeding mechanism above described for drilling, that is, so that the kernels will be dropped one by one and at comparatively short distances apart, it is accomplished as follows: The arm 22 and the stop roller 26 are drawn out to their inactive positions, as shown in dotted lines in Fig. 19. After this, all of the train of parts from the wheel 3 to and including the wheel 20 will be in fixed engagement with each other, and the continuous rotation of the wheel 3 will cause a continuous rotating of the seeder shaft and a corresponding continuous movement of the dropping plates D, with the final result of the drop of a kernel from each of the apertures c that passes the delivery chute during said continuous movement. This moving of the arm 22 and stop 26 away from the rotary parts referred to is effected by means of a foot lever 42. It is hinged at 43 to the frame and at its lower end is pivoted to the link 44. 36 is a crank arm secured to the shaft H, the latter also having fastened to it, as above described, the stop arm 22 and the check fork G. This shaft H is also connected to the valves in the boot or seed chute, in the usual manner. Preferably the crank arm 36 is loosely connected to the link 44 by means of a slot at 37 in the link, and the pin 38 on the crank arm fitting therein.

In order to have the parts brought to a position where drilling can be effected, it is necessary that the lever 42, the link 44 and the crank 36 should be brought to the position shown in dotted lines in Fig. 23. This cannot be done at all times. To prevent its being done at improper times the link 44 is formed or provided with a stop 39, preferably by bending the end part into a hook-like extension. This serves as a stop to prevent the complete movement of the link at times when the parts of the seeder cannot properly be put in the positions for drilling. An opposing stop element is formed on the sliding sleeve 32 in the form of a wing or flange 40 which extends out radially from the axis thereof. When the sleeve and its connected parts are in such positions on the shaft that this stop wing or flange 40 lies in the vertical planes (transversely of the shaft 1) in which the stop hook or lug 39 moves, the latter, by striking against it, will prevent the link 44 from moving backward far enough to cause the opening of the valves and the disengagement of the arm 22 and its stop 26. This wing or flange 40 is in planes such as just referred to when the parts are so set as to cause the planting of two kernels or three kernels to the hill. But the flange 40 is removed from the path of the stop hook or lug 39 when the sleeve 32 has been withdrawn from the clutching mechanism far enough to prevent the cams at 30 and 31 from engaging with or tripping the arm or lever 12. That is to say, if the parts of the seeder be put into the relative positions which they occupy when the mechanism is in action planting four kernels to the hill, they are in the positions for drilling and drilling can be effected at such time provided the stop 26 and its arm 22 are drawn to and locked in their inactive positions, and provided, also, the valves are open and the check levers rendered inactive. And it is when the sleeve 32 with its cams 30 and 31 are in their outermost positions that the parts of the driving mechanism are in the relative positions just referred to, assuming that the stop arm 22 and its connected parts are made inactive.

It will be seen that devices of the kind I have described, when properly constructed and arranged, serve to positively insure that when the valves, check fork, levers and stop arm 22 are set for drilling the parts which act to deliver two kernels to a hill or three kernels to a hill are out of action.

The operator, should he put his foot on lever 42 to open the valves and release the arm 22 for drilling, will be prevented from so throwing the parts unless the cam sleeve 32 is in its outermost position. If his moving the lever 42 is thus stopped he will be compelled to first put his foot on the lever 33 and release it from the notch 35 and slide the part 32 outward on the shaft far enough to bring the flange 40 out of the path of the stop 39. After this has been done he can throw the lever 42, the rock shaft H and the parts connected therewith into position for drilling, at the same time bringing the stop arm 22 away from the drive mechanism and permitting the clutch parts to come into and remain in their connected operative position.

The parts are held in the drilling position by a locking device comprising a notched bracket 45 and a flange or lug 46 on the lever 42 adapted to engage said bracket.

Any well known form of valve and valve moving mechanism can be used. For sake of illustration merely, I have in Fig. 2 shown a valve such as can be used. It is conventionally illustrated at "X", and by the link Y and arm Z is connected to the rock shaft in the usual manner, so that when the wire tappet rocks the shaft the valve will be opened.

I make no claim to any specific features incident to such valve, and in place of that illustrated any that is preferred can be employed.

What I claim is:

1. In a planter, the combination with the seed counter or measurer, of driving means therefor comprising a fixed throw intermittently operating clutch, means for rendering said clutch continuously operative, a second variable throw clutch, adjustable means for disengaging said clutch during a part of the movement of the fixed throw clutch, and means for preventing the operation of the means for rendering the fixed throw clutch continuously operative when the disengaging device of the variable clutch is in operative position.

2. In a planter, the combination with the seed counter or measurer, of driving means therefor comprising an intermittently operating variable throw clutch mechanism, manual controlling means for varying the throw of the clutch, means for rendering said clutch mechanism continuously operative, and means for preventing the operation of the last named means when the clutch mechanism is not set for its maximum throw.

3. The combination of a seed receptacle, a seed separator, means for moving said separator, means for driving said moving means, means for connecting said moving and driving means, means for disengaging said connecting means adapted to act at the ends of predetermined similar cycles, means adapted to automatically disengage the connector during a part of the said cycles, manual means for rendering the disengaging device entirely inoperative, and means for preventing the operation of said manual means while the said automatic means is in operative position.

4. The combination of a seed receptacle, a seed separator, means for moving said separator, means for driving said moving means, means for connecting said moving and driving means, means for disengaging said connecting means adapted to act at the ends of predetermined similar cycles, means adapted to automatically disengage the connector during a part of the said cycles, manual means for rendering the disengaging device entirely inoperative, and means for preventing the operation of said manual means except when the said automatic means is in a predetermined position.

5. The combination of a seed receptacle, the valved seed guide, the seeder plate, the continuously operable plate mover, the continuously acting mover driver, the movable connection between the driver and the mover, the intermitting separator for the connection, the manual withdrawer for the separator, the varier for the connector, and means preventing the action of the manual withdrawer until the varier is in a predetermined position.

6. In a planter, the combination of a seed receptacle, a seed separator, means for driving said separator, means for setting the driving means for continuous operation, means controllable at will for automatically stopping the seed separator intermittingly, means for varying the interval during which the separator is thus stopped, and means preventing the said driving means from being set for continuous operation when said varying means are operative.

7. In a planter, the combination of a seed receptacle, a seed delivering mechanism having a series of seed passages uniformly distant, each from the next, and adapted to either operatively move continuously or move intermittingly through variable distances which are multiples of a unit distance relative to the distance between said seed passages, means for causing the seed delivering mechanism to move continuously, means for interrupting the movement of the seed delivering mechanism, means for varying the distance traveled by the seed delivering mechanism between the times successively of the interruptions of its movement, and means for preventing the continuous movement of the seed delivering mechanism until the devices are thrown out of action which cause the variations in its travel.

8. In a planter, the combination of a seed receptacle, a seed delivering plate having a series of seed passages uniformly distant, each from the next, and adapted either to rotate continuously or to intermittingly travel through variable arc distances which are multiples of the distance between the seed cells, a seed passage below the plate and registering with the passages therein successively, means for causing the plate to rotate continuously, devices for varying the travel and for periodically interrupting the rotation of the plate, and means for preventing the continuous rotation of the plate until the devices which vary its travel are thrown out of action.

9. In a planter, the combination of a seed receptacle, a seed delivering plate having seed passages and adapted to travel either continuously or to travel intermittingly through distances which are multiples of a unit distance, a seed passage registering with the passages in the seed plate, means for continuously rotating the seed plate, means for interrupting the rotation of the seed plate at variable predetermined intervals, and means for preventing the continuous rotation of the plate until the travel varying devices have been thrown out of action.

10. In a planter mechanism, the combination with a seed receptacle, seed delivering mechanism, and a driving apparatus therefor comprising devices whereby said mechanism is adapted to alternately, at will, deliver the kernels singly to the ground or to drop them to the ground in variable hill lots, each lot containing two or more kernels, of means to prevent the seed delivering mechanism and its driving apparatus from dropping the kernels singly to the ground until after the hill varying devices have been thrown out of action.

In testimony whereof I affix my signature, in presence of two witnesses.

HARRY L. DOOLEY.

Witnesses:
ROBERT M. ADAMS,
N. O. PETERSON.

Copies of this patent may be obtained for five cents each, by addressing the "Commissioner of Patents Washington, D. C."

It is hereby certified that in Letters Patent No. 1,138,941, granted May 11, 1915, upon the application of Harry L. Dooley, of Rock Island, Illinois, for an improvement in "Variable-Drop Planters," an error appears in the printed specification requiring correction as follows: Page 4, line 35, for the word "calls" read *cells*; and that the said Letters Patent should be read with this correction therein that the same may conform to the record of the case in the Patent Office.

Signed and sealed this 6th day of July, A. D., 1915.

[SEAL.]

R. F. WHITEHEAD,

*Acting Commissioner of Patents.*